(12) United States Patent
Lee

(10) Patent No.: US 7,016,993 B2
(45) Date of Patent: Mar. 21, 2006

(54) I2C MUX WITH ANTI-LOCK DEVICE

(75) Inventor: James Lee, Taipei (TW)

(73) Assignee: Inventec Corporation, Taipei (TW)

( * ) Notice: Subject to any disclaimer, the term of this patent is extended or adjusted under 35 U.S.C. 154(b) by 373 days.

(21) Appl. No.: 10/320,687

(22) Filed: Dec. 17, 2002

(65) Prior Publication Data

US 2004/0117525 A1 Jun. 17, 2004

(51) Int. Cl.
  *G06F 13/00* (2006.01)
  *G06F 13/14* (2006.01)
  *G06F 11/00* (2006.01)
(52) U.S. Cl. .................. 710/100; 710/305; 714/56
(58) Field of Classification Search ................ 710/100, 710/305, 316; 714/51, 55–56, 23
See application file for complete search history.

(56) References Cited

U.S. PATENT DOCUMENTS 6,718,488 B1 * 4/2004 Jue et al. ...................... 714/43
6,725,320 B1 * 4/2004 Barenys et al. ............. 710/316
6,728,908 B1 * 4/2004 Fukuhara et al. ............. 714/48
6,769,078 B1 * 7/2004 Barenys et al. ............... 714/43
6,816,939 B1 * 11/2004 Bandholz et al. ........... 710/305

* cited by examiner

*Primary Examiner*—Rehana Perveen
*Assistant Examiner*—Nimesh G. Patel
(74) *Attorney, Agent, or Firm*—Jacobson Holman PLLC

(57) ABSTRACT

An I2C MUX with an anti-lock device comprises an I2C multiplexer (I2C MUX) and a reset unit. The I2C MUX is used to connect with a system, which has a central processing unit (CPU), an I2C main control unit, and a plurality of I2C elements. The reset unit is connected to the CPU and the I2C MUX. The I2C main control unit emits a signal to the CPU, and the CPU then sends an open-circuited signal to the reset unit. The reset unit sends a reset signal to the I2C MUX to reconnect the I2C MUX with one of the multiple normal I2C elements and the I2C main control unit when the connection between the chosen I2C element, the I2C MUX and the I2C main control unit is broken.

15 Claims, 6 Drawing Sheets

I2C MUX WITH ANTI-LOCK DEVICE

TECHNICAL FIELD

The invention relates to an I2C MUX, and more particularly to an I2C MUX with an anti-lock device.

TECHNICAL BACKGROUND

I2C (Inter Integrated Circuit) is a bus used to transfer data flow among ICs. More wire connections and decoding circuits are needed with ICs due to a more complex parallel structure taken by the conventional bus. A bus with more wire connections also yields stronger electromagnetic interference. The double-line serial bus I2C is a solution for the above problems.

The I2C is used in systems comprising micro-controllers and other peripherals, and in systems with multi-masters, because the I2C does not require complex decode circuits and Transmission Control Protocol, and because of its software planning ability, removing and increasing ICs doesn't influence the each element in the original system. Thus debugging and maintenance are very easy.

However, in order for different I2C elements to connect with each other, especially when they are used in a system with a single mainframe and multiple I2C elements, they must be recognizable. At present, the method for identifying different I2C elements is to use addressing. But, a multiplexer must be used to do switching if the addresses of the different I2C elements are the same. This multiplexer is also one kind of I2C element.

As FIG. 1 shows, an I2C multiplexer 20 is currently used to multiplex an I2C main controller unit 10 and other I2C elements (I2C element 30, I2C element 40 and I2C element 50). The I2C main controller unit 10 can also be connected to I2C elements 60 and 70. More I2C elements can be connected to the I2C main controller unit by switching the I2C multiplexer 20.

However, for unknown reasons, a short circuit occurs in the connections between the I2C main controller unit 10, the I2C multiplexer 20, and the I2C elements when a short circuit occurs in an I2C channel chosen by the main I2C main controller unit 10 through the I2C mutilplexer 20. That is to say, the I2C main controller unit 10 cannot control the I2C elements connected with the I2C multiplexer 20 through the bus A of the I2C multiplexer 20. Therefore, a solution for avoiding the above problem is needed.

SUMMARY OF THE INVENTION

One object of the invention is to provide an I2C MUX with an anti-lock device, which is connected to a system and multiple I2C elements. The system comprises a central processing unit (CPU) and an I2C control unit. The invention comprises an I2C multiplexer and a reset unit. The I2C multiplexer is used to choose one of the I2C elements to connect with I2C control unit. The reset unit is connected to the CPU and the I2C multiplexer. The I2C control unit emits a signal to the CPU, and then the CPU sends an open-circuited signal to the reset unit when the condition of open circuit occurs between the I2C element, the I2C multiplexer and the I2C control unit. The reset unit then sends a reset signal to the I2C multiplexer so as to reconnect the I2C multiplexer with one of the other normal I2C elements and the I2C control unit.

The reset unit at least consists of a switch unit and an amplifier unit. The switch unit is connected with a power supply and the I2C multiplexer and used to switch the connection between the power supply and the I2C multiplexer. The input end of the amplifier unit is connected to the CPU, and its output end is connected to the trigger end of the switch element. The amplifier unit is used to receive and amplify the open-circuited signal sent out by the CPU so as to trigger the switch to the "ON" ("open") position, and cause the power supply to send out a reset signal.

Using a MOS switch element as the switch and a transistor as the amplify unit are the solutions taken into consideration in practice.

An I2C Bus Data signal detector, an I2C Bus Clock signal detector and an I2C Bus process can further be implemented in the reset unit of the invention. The data line of the I2C bus is connected the reset unit to the I2C Bus Data signal detector, and the clock line of the I2C bus is connected to the reset unit to the I2C Bus Clock signal detector. Finally, the I2C bus process acts as a signal-emitting end that starts the reset signal according to whether the data signal and the clock signal are normal, and sends an error signal of the I2C bus to the CPU.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
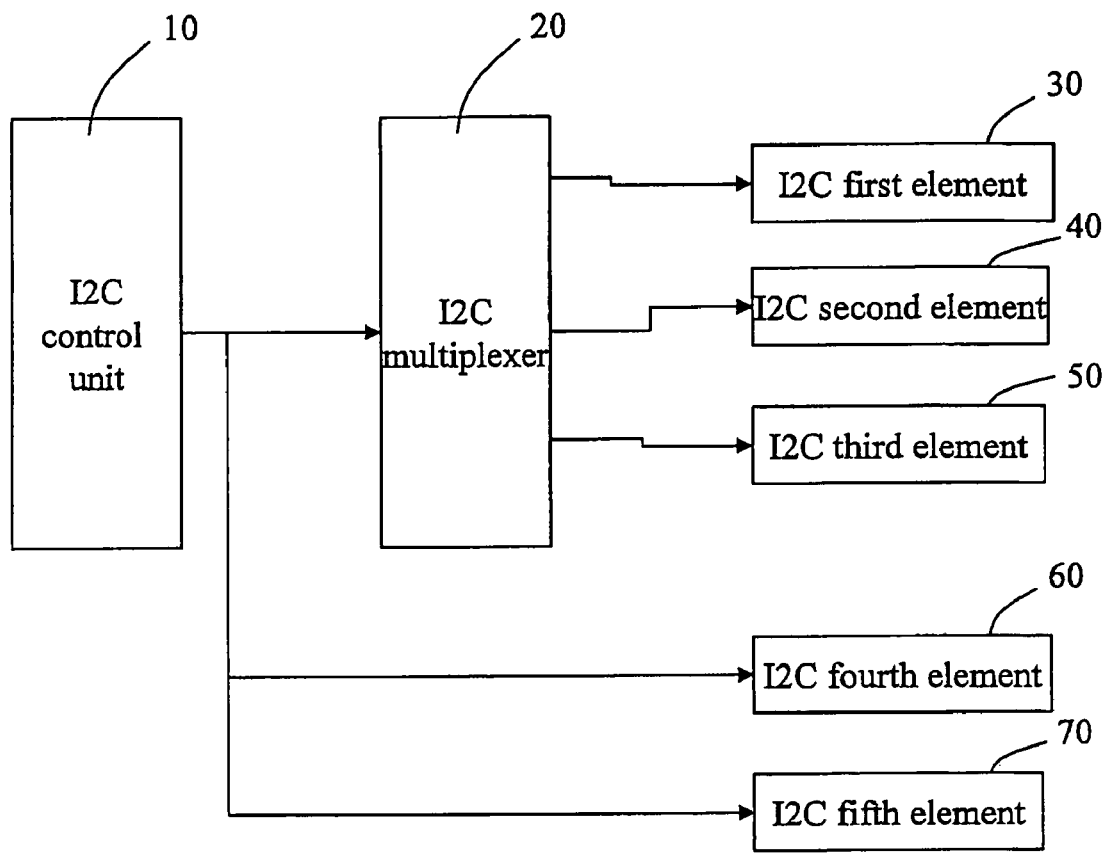
FIG. 1 is an application schematic graph of the conventional I2C.
Figure 2:
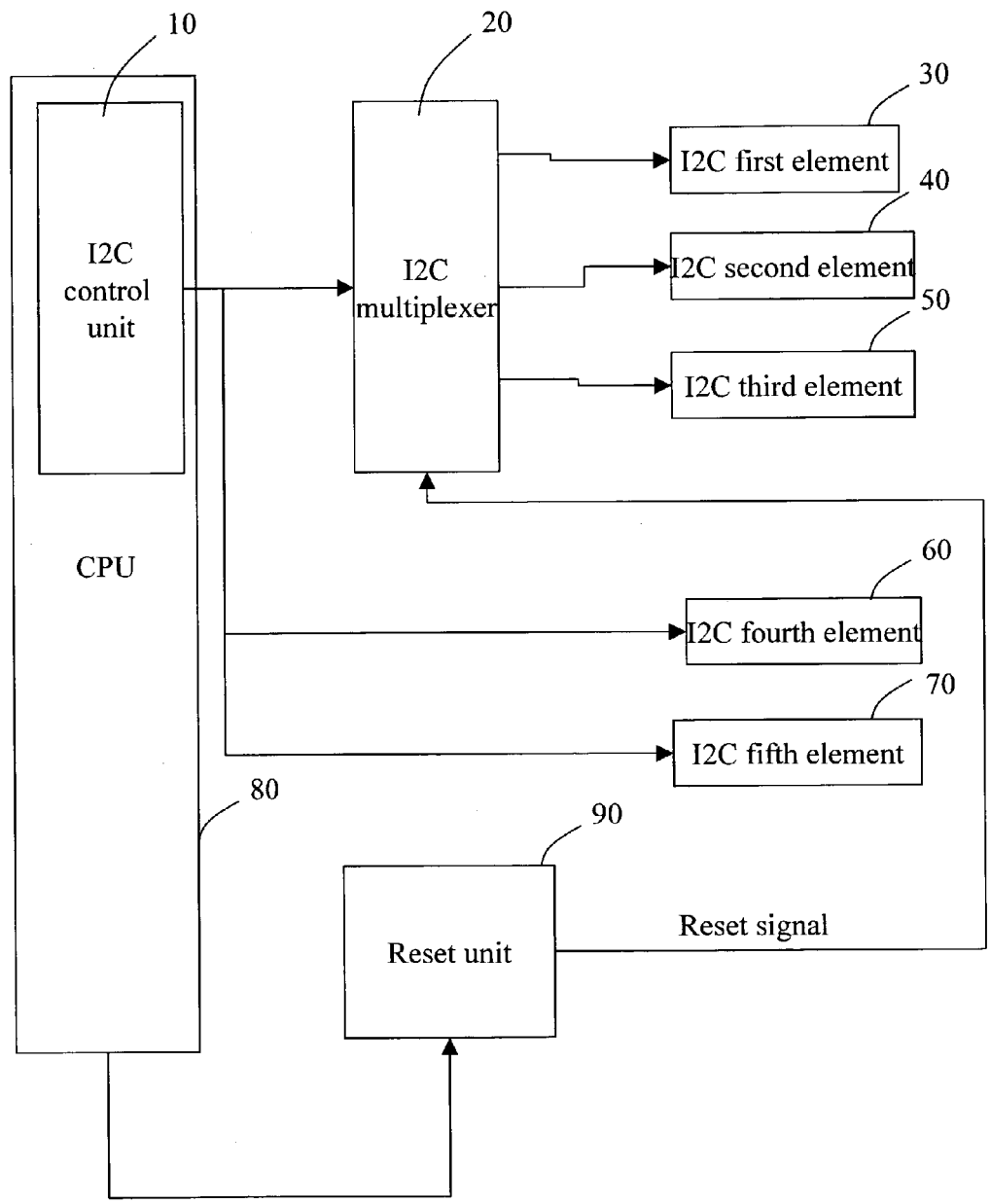
FIG. 2 is a circuit block diagram of an I2C MUX with an anti-lock device of the invention.

Comparing FIG. 2 with FIG. 1 it can be seen that the invention makes the I2C multiplexer 20 anti-lock by adding a reset unit 90 in the system. For an example, when a condition of open circuit occurs between the I2C element 30 and the I2C multiplexer 20, the circuit is open and cannot be used (it is locked). This causes the line connection between the I2C multiplexer 20 and the I2C main controller unit 10 to be uncompletely connected. The I2C main controller unit can reconnect with other I2C elements 40 and 50 through the I2C multiplexer by using the reset unit 90 of the invention before the cause of the short circuit is found.

The open-circuited signal of the I2C multiplexer 20 is transmitted to the reset unit 90 through the CPU 80 after the power source is cut even if the lock condition isn't removed. A reset signal sent out from the reset unit 90 allows the I2C multiplexer 20 to start again. Finally, the I2C main controller unit 10 can be reconnected to the normal I2C units 40 and 50 through the I2C multiplexer 20.

Figure 3:
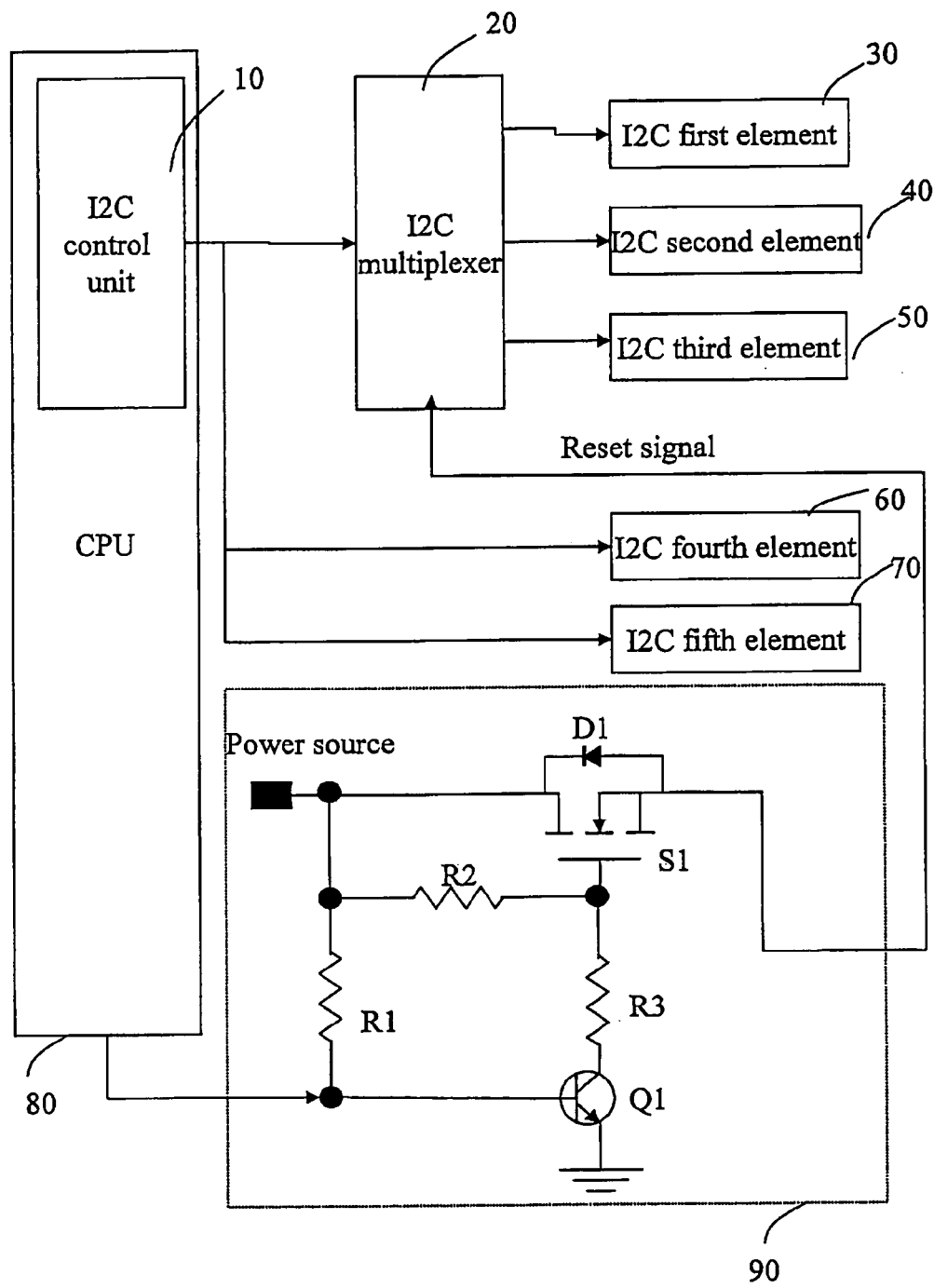
FIG. 3 is a circuit block diagram of an I2C MUX with an anti-lock device of a first embodiment of the invention.

The specific circuit of the reset unit 90 in FIG. 2 is shown in FIG. 3; this is a first preferred embodiment according to the invention. In fact, the reset unit can be normally designed; that is to say, it is fabricated with at least one amplifier unit and one switch unit. A specific fabrication can be found in FIG. 3.

Referring to FIG. 3, resistors R1, R2 and R3, a transistor Q1 (used as an amplifier unit), a MOS switch S1 (used as a switch unit) and a diode D1 form the reset unit 90. The N-side of the diode D1 and the drain (D) of the MOS switch S1 are connected parallel to the power source. The p-side of D1 and the source of S1 are connected parallel to the I2C multiplexer. The gate (G) of the MOS switch S1 is connected to the resistors R2 and R3. The other end of the resistor R3 is connected to the collector of the transistor Q1. The other end of the resistor R2 is connected to the source power and the drain pole (D) of the MOS switch. One end of the resistor R1 is connected to the power source, the resistor R2 and the drain (D) of the MOS switch. The other end thereof is connected to the gate of the transistor Q1 and the open-circuited port of the I2C multiplexer 20 in the CPU 80. Finally, the emitter of the transistor Q1 is grounded (GND).

Therefore, the MOS switch S1 normally blocks the power source and the I2C multiplexer 20, and conducts electricity to the I2C multiplexer 20 only when reset is needed.

The MOS switch S1 is off in normal conditions. Once the I2C multiplexer 20 and the I2C elements are disconnected for unknown reasons so as to create a lock phenomena, the CPU 80 senses this disconnection through the I2C main controller unit. The CPU 80 outputs an open-circuited signal of the I2C multiplexer 20 when the above situation occurs. The open-circuited signal of the I2C multiplexer 20 is amplified through the transistor Q1 and then transmitted through the resistor R3 to the gate (G) of the MOS switch S1 to conduct the MOS switch because the output end of the open-circuited signal of the I2C mutiplexer is connected to the input end of the reset unit 90, which is also the ground pole of the transistor Q1. At last, a high voltage is transmitted to the I2C multiplexer 20 from the power source to reset the I2C multiplexer 20.

The CPU 80 outputs no more open-circuited signals of the I2C multiplexer 20 once the I2C multiplexer 20 is restored to normal, i.e. when condutivity is formed between the I2C multiplexer 20 and other functional I2C elements. The MOS switch returns to the "OFF" state (normal state).

Figure 4:
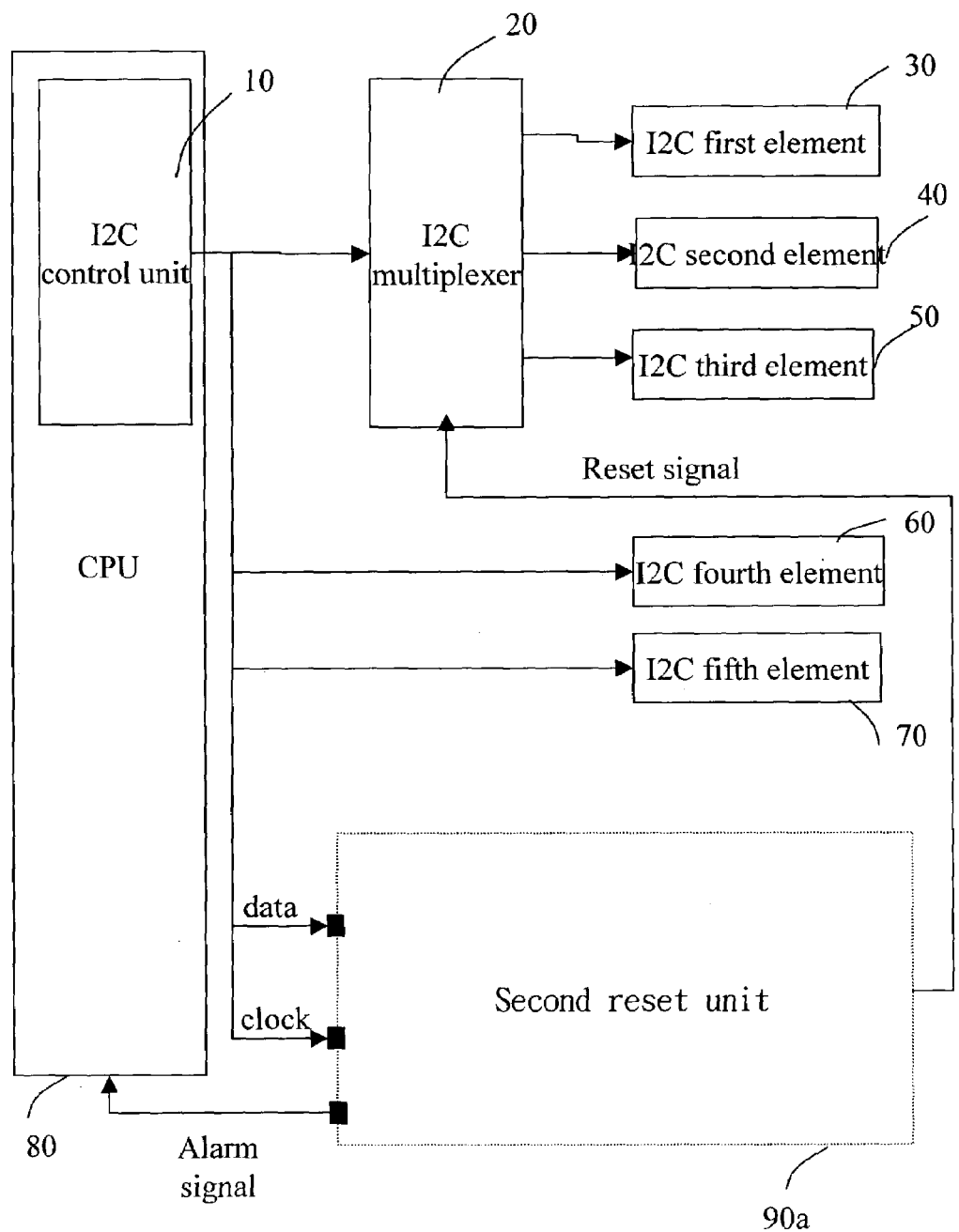
FIG. 4 is a circuit block diagram of an I2C MUX with an anti-lock device of a second embodiment of the invention.
Figure 5:
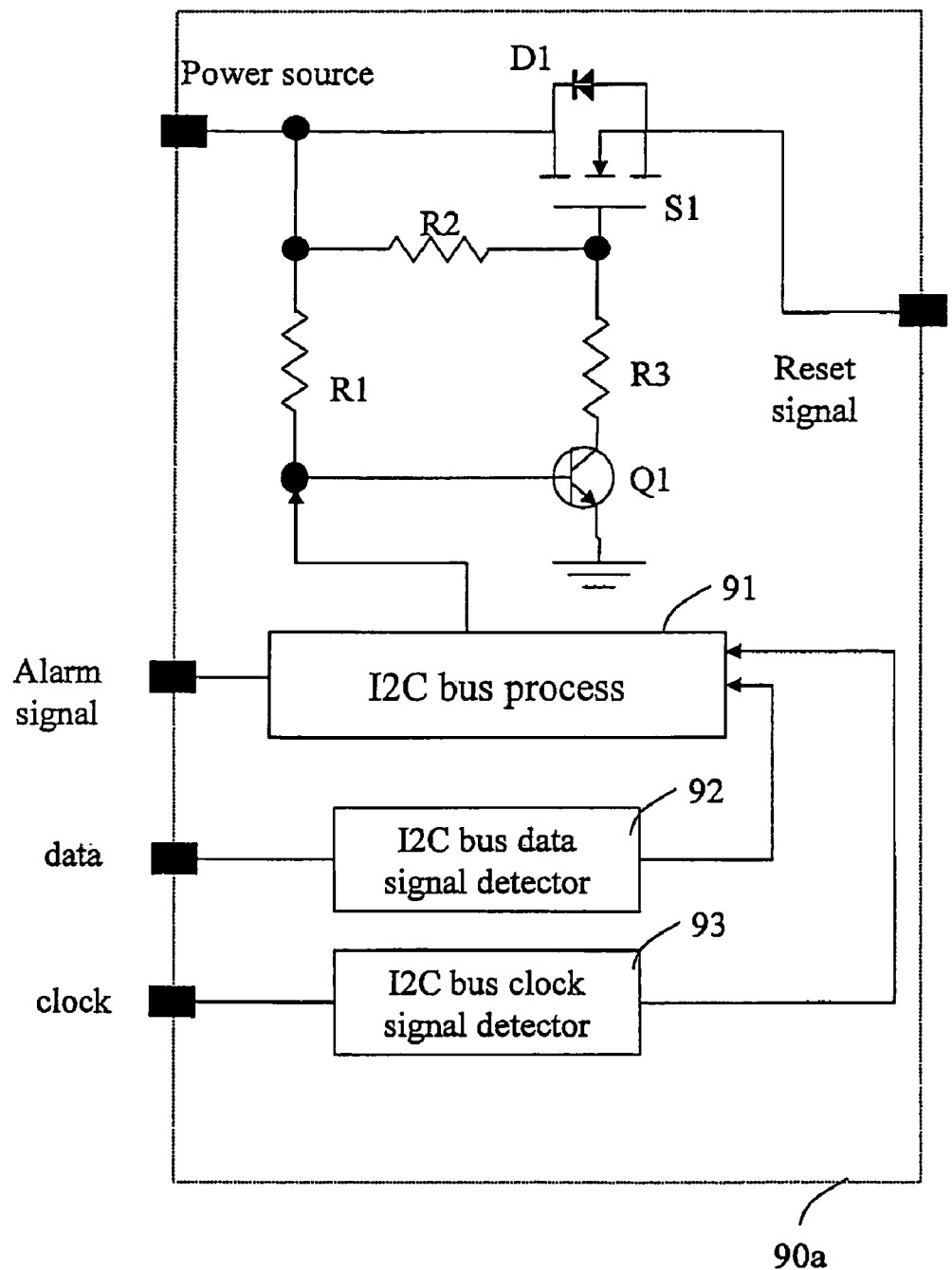
FIG. 5 is a block diagram of an I2C MUX with an anti-lock device of a second embodiment of the invention, showing a specific circuit for a second reset unit.
Figure 6:
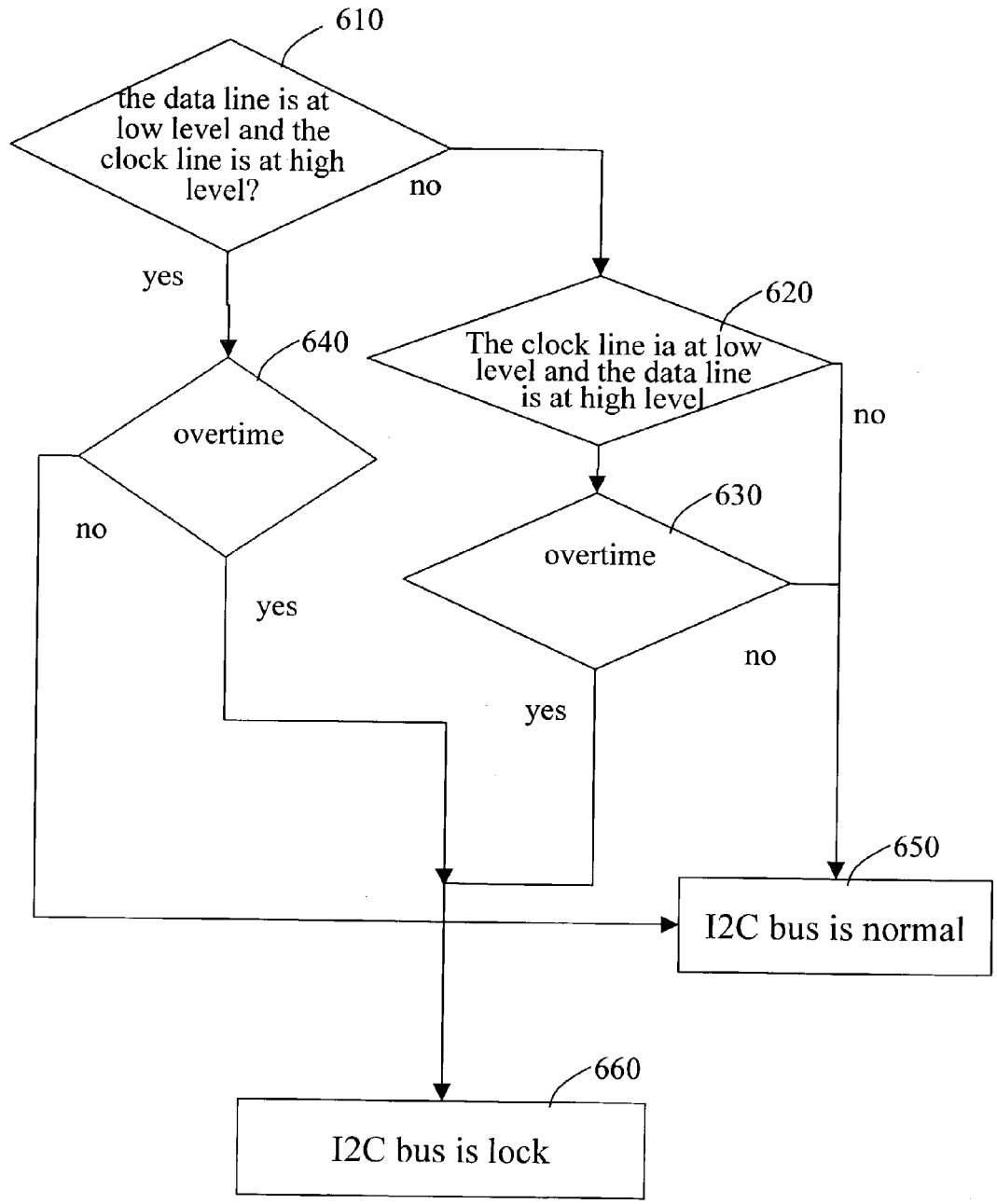
FIG. 6 is a flow chart of an I2C MUX with an anti-lock device of a second embodiment of the invention, showing steps for judging the condition of an I2C bus.

A second preferred embodiment of the invention is shown in FIGS. 4 to 6. I2C data and clock signals and an algorithm are used to detect whether the I2C is locked in the second preferred embodiment. Therefore, the device of the invention can not only reset the I2C multiplexer, but can also inform the CPU what happens so as to prevent the CPU from mistakenly determining that the I2C bus is locked just because the CPU cannot find the I2C elements.

First, refer to FIG. 4, which shows the circuit block diagram of the second embodiment of the invention. Comparing to FIG. 2, the difference between the first and the second embodiments is that the circuit arrangement of a second reset unit 90a is different from that of the reset unit 90 (see FIG. 2). The input of the second reset unit 90a is the I2C data line and the I2C clock line. Therefore, the input signals of the second reset unit 90a are both the data signal and the clock signal. And, the second reset unit 90a outputs an alarm signal to the CPU 80 when a malfunction occurs in the I2C bus.

Next, refer to FIG. 5, which shows the circuit of the second reset unit. The determinations of the data and the clock lines of the I2C bus are used in order to obtain the alarm signal in the second preferred embodiment of the invention. Therefore, an I2C bus data signal detector 92 and an I2C bus clock signal detector 93 are added in the second embodiment, and an I2C bus process 91 is used to judge whether the alarm signal is emitted to initiate the reset mechanism when the I2C bus is abnormal.

FIG. 6, which is a judgment flow chart of the second embodiment of the invention, shows how the I2C bus process judges the malfunction of the I2C bus. The data and clock lines are switched between a low level (voltage) and high level under normal conditions. They are fixed at the high level when abnormal conditions occur, so that a standard for judgment can be set. First, step 610 judges whether the data line is at low level and the clock line is at high level. If it is such the case, judge whether the data line at the high level is overtime on the basis of a specific time period (step 640). If it is overtime, the I2C bus is locked (step 660). If it is not the case in step 610, then judge whether the clock line is at the low level and the data line is at the high level (step 620). If it is, judge whether the data line at the high level is overtime according the above specified time period (step 630). If it is overtime, the I2C bus is locked (step 660).

However, if the conditions do not match the criteria mentioned above, i.e. the clock line and the data line are switched between the high and low levels continuously, the I2C bus is normal (step 650). This also means that when the data line is at the low level and the clock level is at the high level (step 610), and the clock line at the high level is not overtime at step 640, the I2C bus is normal (step 650). When the data line at the high level is not overtime at step 630, the I2C bus is normal (step 650).

Therefore, the reset signal can be emitted and the CPU can be informed of the lock of the I2C through the operation of the second embodiment of the invention. Here, the I2C bus process can be programmed using a PLD (programmable logic device).

The I2C MUX with anti-lock device disclosed in the invention can prevent the other applicable I2C elements from being stopped when the circuit between one single I2C element and the I2C multiplexer is open.

It is noted that the description mentioned above is of the preferred embodiments of the invention and is for the purpose of illustration only. It is not intended as a definition of the limits and scope of the invention disclosed. Any modifications and variations that may be apparent to a person skilled in the art are intended to be included within the scope of the following claims.

What is claimed is:

1. An I2C MUX with an anti-lock device, being connected to a system having a central process unit (CPU) and an I2C main control unit, and a plurality of I2C elements, comprising:

an I2C multiplexer (I2C MUX), used to choose one of said I2C elements to connect with said I2C main control unit; and a reset unit, connected to said CPU and said I2C MUX, said I2C main control unit emitting a signal to said CPU, and then said CPU sending an open-circuited signal to said reset unit, said reset unit sending a reset signal to said I2C MUX to reconnect said I2C MUX with one of said I2C elements and said I2C main control unit when the connection among said chosen I2C element, said I2C MUX and said I2C main control unit is broken;

wherein said reset circuit comprises:

a switch unit, being connected with a power source and said I2C MUX, used to switch the connection between said power source and said I2C MUX; and an amplifier unit, an input end thereof being connected to said CPU, an output end thereof being connected to an triggering end of said switch unit, used to receive and amplify said open-circuited signal transmitted by said CPU to trigger said switch unit to be "ON", and further to cause said power source to send out said reset signal.

2. The I2C MUX of claim 1, wherein said reset unit further comprises:
a first resistor, connected to said power source and said input end of said amplifier unit;
a second resistor, connected to said power source and said triggering end of said switch unit; and
a third resistor, being connected to said triggering end of said switch unit and said output end of said amplifier unit.

3. The I2C MUX of claim 2, wherein said switch unit is a MOS switch.

4. The I2C MUX of claim 3, wherein the drain of said MOS switch is connected to said power source, the source is connected to said reset unit and the gate thereof is connected to said second resistor and said third resistor.

5. The I2C MUX of claim 3, wherein said MOS is further connected in parallel to a diode, the N-side thereof is connected to said power source, the P-side thereof is connected to said I2C MUX.

6. The I2C MUX of claim 3, wherein said amplifier unit is a transistor.

7. The I2C MUX of claim 3, wherein the collector pole of said transistor is connected to said third transistor, the base is connected to said first resistor and said CPU, and the emitter thereof is grounded.

8. An I2C MUX with an anti-lock device, being connected to a system having a central process unit (CPU) and an I2C main control unit, and a plurality of I2C elements, comprising:
an I2C Multiplexer (I2C MUX) for choosing one of said I2C elements to connect with said I2C main control unit; and
a reset unit connected to said CPU and said I2C MUX for receiving an open-circuited signal from said CPU and sending a reset signal to said I2C MUX to reconnect said I2C MUX with one of said I2C elements and said I2C main control unit when the connection among said chosen I2C element, said I2C MUX and said I2C main control unit is broken;
wherein said reset unit comprises:
a switch unit, being connected with a power source and said I2C MUX, used to switch the connection between said power source and said I2C MUX; and
an amplifier unit, an output end thereof being connected to an triggering end of said switch unit, used to receive and amplify said open-circuited signal to trigger said switch unit to be "ON", and further to cause said power source to send out said reset signal.

9. The I2C MUX of claim 8, wherein said reset unit further comprises:
a first resistor, being connected to said power source and said input end of said amplifier unit;
a second resistor, being connected to said power source and said detonation end of said switch unit;
a third resistor, being connected to said detonation end of said switch unit and said output end of said amplifier unit;
an I2C bus data signal detector, being connected with a data line of said I2C bus;
an I2C bus clock signal detector, being connected with a clock line of said I2C bus; and
a bus process, an input end thereof being connected with output ends of said I2C bus clock signal detector and said I2C bus clock signal detector respectively, two output ends thereof being connected with an output end of said amplifier unit and said CPU respectively, used to output said open-circuited signal to said CPU and said amplifier unit when the outputs of said data line and said clock line are abnormal.

10. The I2C MUX of claim 9, wherein said switch unit is a MOS switch.

11. The I2C MUX of claim 10, wherein the drain of said MOS switch is connected to said power source, the source is connected to said reset unit and the gate thereof is connected to said second resistor and said third resistor.

12. The I2C MUX of claim 10, wherein said MOS is further connected in parallel to a diode, the N-side thereof is connected to said power source, the P-side thereof is connected to said I2C MUX.

13. The I2C MUX of claim 9, wherein said amplifier unit is a transistor.

14. The I2C MUX of claim 9, wherein the collector of said transistor is connected to said third resistor, the base is connected to said first resistor and said bus process, and the emitter thereof is grounded.

15. The I2C MUX of claim 9, wherein said I2C bus process is a programmable logic device (PLD).

* * * * *